(12) United States Patent
Lim et al.

(10) Patent No.: US 11,917,680 B2
(45) Date of Patent: Feb. 27, 2024

(54) WLAN SENSING BASED ON MULTIPLE CHANNEL OR RESOURCE

(71) Applicant: LG ELECTRONICS INC., Seoul (KR)

(72) Inventors: Dongguk Lim, Seoul (KR); Jeongki Kim, Seoul (KR); Jinsoo Choi, Seoul (KR); Insun Jang, Seoul (KR); Sanggook Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 288 days.

(21) Appl. No.: 17/466,126

(22) Filed: Sep. 3, 2021

(65) Prior Publication Data
US 2022/0070927 A1    Mar. 3, 2022

Related U.S. Application Data

(60) Provisional application No. 63/074,389, filed on Sep. 3, 2020.

(51) Int. Cl.
*H04L 12/28* (2006.01)
*H04W 72/0453* (2023.01)
*H04W 24/10* (2009.01)
*H04J 1/16* (2006.01)
*H04W 84/12* (2009.01)

(52) U.S. Cl.
CPC ....... *H04W 74/0808* (2013.01); *H04W 24/10* (2013.01); *H04W 72/0453* (2013.01); *H04W 84/12* (2013.01)

(58) Field of Classification Search
CPC . H04B 7/0417; H04L 25/0224; H04L 5/0044; H04L 27/2603; H04W 24/10; H04W 84/12; H04W 72/0453
USPC ............................... 370/252, 278, 329, 430
See application file for complete search history.

(56) References Cited

U.S. PATENT DOCUMENTS

| | | | |
|---|---|---|---|
| 2016/0262051 A1* | 9/2016 | Merlin | H04B 7/0626 |
| 2016/0315681 A1* | 10/2016 | Moon | H04W 74/0816 |
| 2021/0288779 A1* | 9/2021 | Da Silva | H04L 5/0051 |
| 2022/0141062 A1* | 5/2022 | Yu | H04L 27/2666 |
| | | | 370/329 |
| 2023/0016370 A1* | 1/2023 | Kim | H04L 5/0007 |
| 2023/0114857 A1* | 4/2023 | Lou | H04W 28/065 |
| | | | 370/329 |

* cited by examiner

*Primary Examiner* — John Pezzlo
(74) *Attorney, Agent, or Firm* — LEE, HONG, DEGERMAN, KANG & WAIMEY

(57) ABSTRACT

The present specification proposes various technical characteristics that may be applied to a Wireless Local Area Network (WLAN) sensing. For example, the present specification proposes a procedure for WLAN sensing using multiple channels or multiple resources. The same or different channels and/or resources may be allocated to at least one wireless device performing the WLAN sensing. The at least one wireless device may perform measurement and signal transmission/reception processes that are included in the WLAN sensing by using the channel(s) and/or resource(s).

12 Claims, 21 Drawing Sheets

FIG. 8

| L-STF | L-CEF | L-Header | EDMG-Header-A | EDMG-STF | EDMG-CEF |

FIG. 9

| L-STF | L-CEF | L-Header | EDMG-Header-A | EDMG-CEF |

FIG. 10

| L-STF | L-CEF | L-Header | EDMG-Header-A | EDMG-STF | EDMG-CEF | TRN |

FIG. 11

| L-STF | L-CEF | L-Header | EDMG-Header-A | EDMG-STF | TRN |

1510

1520

WLAN SENSING BASED ON MULTIPLE CHANNEL OR RESOURCE

CROSS-REFERENCE TO RELATED APPLICATIONS

Pursuant to 35 U.S.C. § 119, this application claims the benefit of U.S. Provisional Application No. 63/074,389, filed on Sep. 3, 2020, the contents of which is hereby incorporated by reference herein in its entirety.

TECHNICAL FIELD

The present specification relates to a wireless local area network (WLAN) system and, most particularly to a method for performing WLAN sensing by using multiple channels or multiple resources and a device using the same.

BACKGROUND

A wireless local area network (WLAN) has been improved in various ways. For example, IEEE 802.11bf WLAN sensing is a first standard in which communication and radar technologies are integrated. Although the demand for unlicensed frequency is increasing in our daily lives and throughout the overall industry, since there are limitations in new (or fresh) supply of frequency, the communication-radar integration technology is a highly preferable orientation in the aspect of increasing efficiency in the usage of frequency. Although a sensing technology for detecting movement (or motion) behind walls by using WLAN signals, or a radar technology for detecting movement (or motion) inside a vehicle by using Frequency Modulated Continuous Wave (FMCW) signals at a 70 GHz band are already under development, upgrading the sensing capability to a higher level by associating the current technology with the IEEE 802.11bf standardization has great significance. Most particularly, in modern society, the importance of privacy protection is becoming more emphasized. Therefore, unlike CCTVs, since the WLAN sensing technology in known to cause less legal issues related to privacy invasion, the development of WLAN sensing technology is anticipated.

Meanwhile, the overall radar market is expected to show an average annual growth of approximately 5% up to year 2025 throughout the automobile industry, national defense, industry, daily life, and so on. And, most particularly, in case of sensors used in daily life, the average annual growth is expected to mark an outstanding increase of up to 70%. The wireless LAN (WLAN) sensing technology may be extensively applied in our everyday lives so as to provide functions, such as motion detection (or recognition), respiration monitoring, positioning/tracking, falling detection, detecting presence of children in cars, emergence/proximity recognition, individual identification, bodily motion (or movement) recognition, gesture recognition, and so on. Thus, the growth of related new businesses may be promoted, and, accordingly, corporate competitiveness is expected to be improved.

For example, the WLAN sensing that is proposed in the present specification may be used for sensing movement (or motion) or gestures of an object (person or object). More specifically, a WLAN STA may perform sensing of the movement (or motion) or gestures of an object (person or object), based on a measurement result for various types of frames/packets, which are designed for WLAN sensing.

SUMMARY OF THE DISCLOSURE

In the next generation WLAN system, the adoption of WLAN sensing between multiple STAs and an AP is in discussion. In order to enhance accuracy and resolution in WLAN sensing, a method for efficiently performing WLAN sensing between multiple STAs and an AP is required.

In order to support the WLAN sensing between multiple STAs and an AP in a WLAN system, the present specification proposes a WLAN sensing method using multiple channels or multiple resource and a device using the same. According to various embodiment of the present specification, the AP allocates a sensing unit, which is a resource unit that performs a sensing operation, to the multiple STAs.

The present specification proposes technical characteristics supporting WLAN sensing, which uses multiple channels or multiple resources in a WLAN system. Based on the examples presented in the present specification, in order to perform resource-efficient WLAN sensing in various frequency bands, WLAN sensing using multiple channels or multiple resources, resource allocation for the WLAN sensing, and signal transmission/reception for the WLAN sensing may be supported.

BRIEF DESCRIPTION OF THE FIGURES

FIG. 8 shows an example of a sensing frame format.

FIG. 9 shows another example of a sensing frame format.

FIG. 10 shows yet another example of a sensing frame format.

FIG. 11 shows yet another example of a sensing frame format.

DETAILED DESCRIPTION

Figure 1:
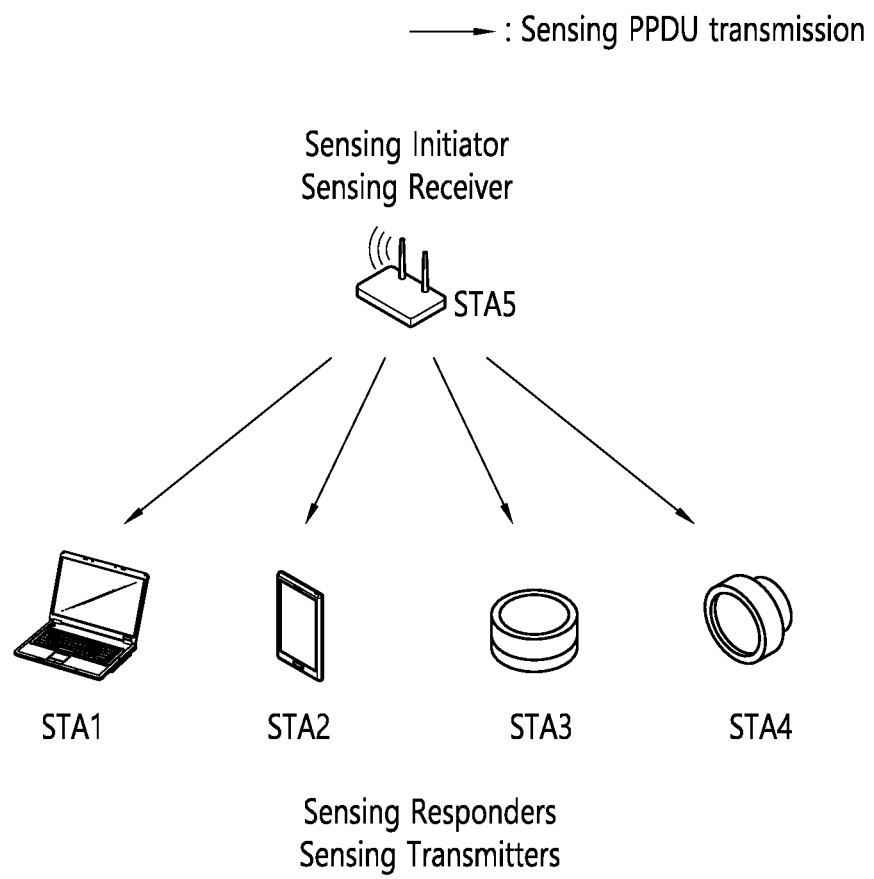
FIG. 1 shows an exemplary WLAN sensing scenario using multiple sensing transmitting devices.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11ad standard or the IEEE 802.11ay standard. In addition, the present specification may also be applied to the newly proposed EHT standard or IEEE 802.11bf standard.

Hereinafter, in order to describe a technical feature of the present specification, a technical feature applicable to the present specification will be described.

Although a WLAN sensing technology is a type of radar technology that can be implemented without any standard, by standardizing the WLAN sensing technology, a more powerful performance is expected to be gained. In the IEEE 802.11bf standard, devices that participate in WLAN sensing are defined per function as shown below in the following table. In accordance with the functions, the devices may be classified as a device that initiates WLAN sensing, a device that participates in WLAN sensing, a device that transmits a sensing Physical Layer Protocol Data Unit (PPDU), a device that receives a sensing PPDU, and so on.

TABLE 1

| Terms | Functions |
| --- | --- |
| Sensing Initiator | Device that initiates sensing |
| Sensing Responder | Device that participates in sensing |
| Sensing Transmitter | Device that transmits a sensing PPDU |
| Sensing Receiver | Device that receives a sensing PPDU |

FIG. 1 shows an exemplary WLAN sensing scenario using multiple sensing transmitting devices.

Figure 2:
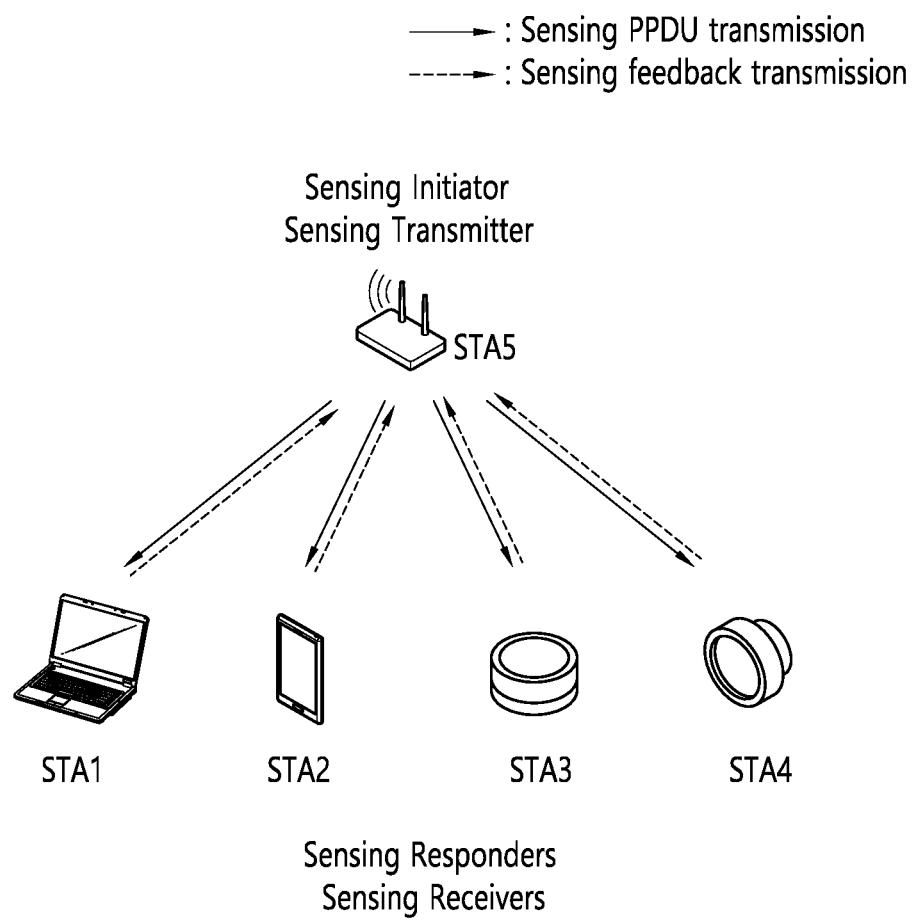
FIG. 2 shows an exemplary WLAN sensing scenario using multiple sensing receiving devices.

FIG. 2 shows an exemplary WLAN sensing scenario using multiple sensing receiving devices.

FIG. 1 and FIG. 2 show sensing scenarios according to the functions and positioning of WLAN sensing devices. In an environment where it is assumed that one sensing initiator and multiple sensing responders exist, FIG. 1 is a scenario using multiple sensing PPDU transmitters, and FIG. 2 is a scenario using multiple sensing PPDU receivers. When it is assumed that a measurement signal processor is included in the sensing PPDU receiver, in case of FIG. 2, a procedure that transmits (feedback) a sensing measurement result to a sensing initiator (STA 5) is additionally needed.

Figure 3:
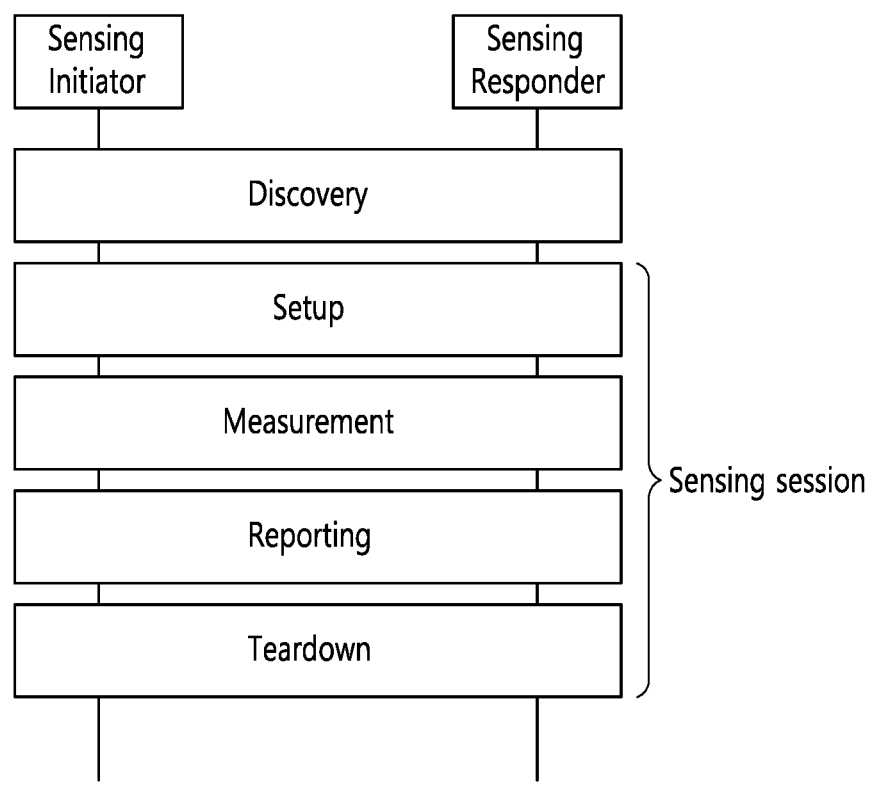
FIG. 3 shows an example of a WLAN sensing procedure.

FIG. 3 shows an example of a WLAN sensing procedure.

The procedure according to which WLAN sensing is carried out consists of processes of discovery, negotiation, measurement exchange, tear down, and so on, between the WLAN sensing initiator(s) and responder(s). The discovery process is a process of identifying the sensing capabilities of the WLAN devices, the negotiation process is a process of determining sensing parameters between a sensing initiator and sensing responder(s), the measurement exchange process is a process of sensing a sensing PPDU and transmitting sensing measurement result, and the tear down process is a process of ending the sensing procedure.

Figure 4:
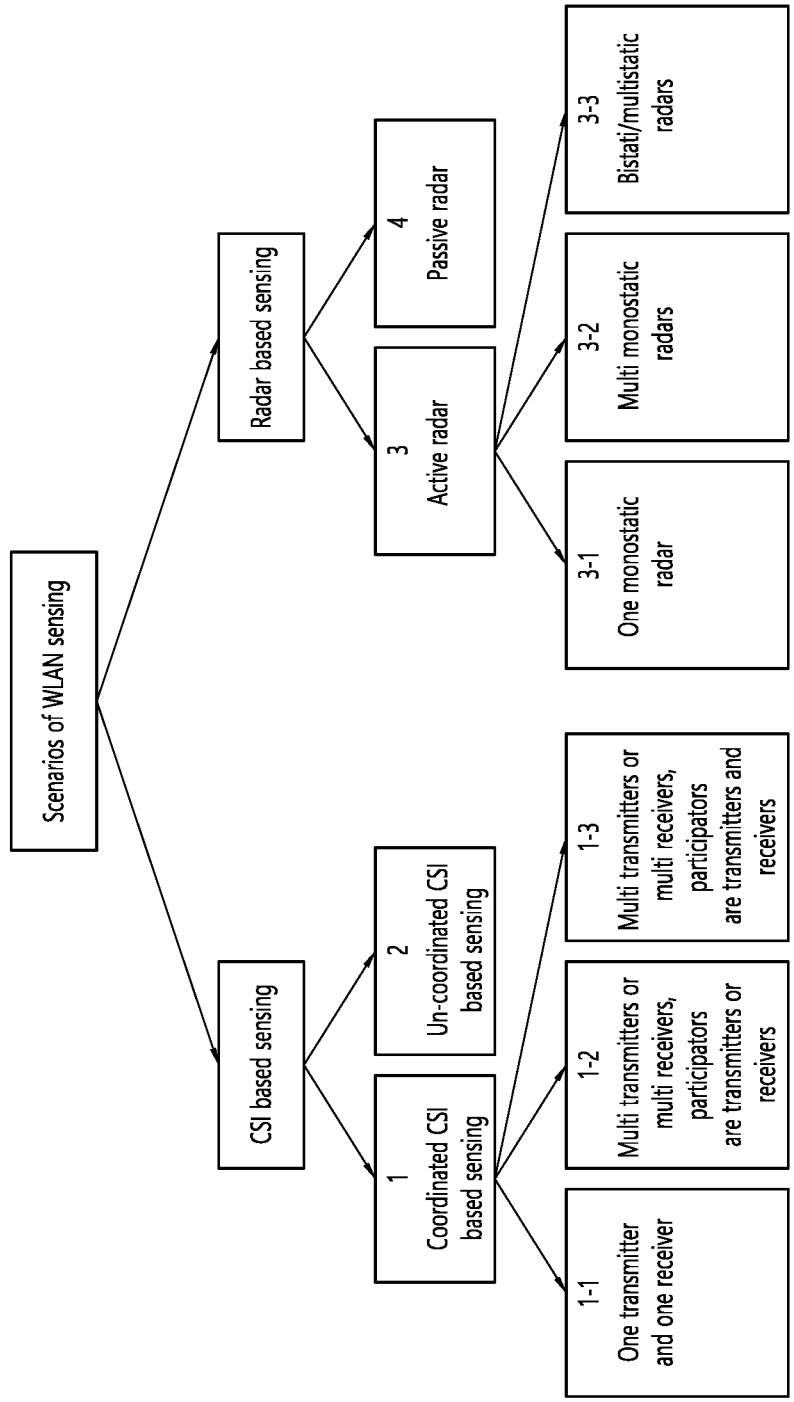
FIG. 4 is an exemplary classification of WLAN sensing.

FIG. 4 is an exemplary classification of WLAN sensing.

WLAN sensing may be classified as CSI-based sensing, which uses channel state information of a signal that is sent from a transmitter, passes through a channel, and reaches a receiver, and radar-based sensing, which uses a signal that is a transmission (Tx) signal that is received after being reflected from an object. Additionally, each sensing technology is then divided into a method in which a sensing transmitter directly engages in the sensing process (coordinated CSI, active radar), and a method in which the sensing transmitter does not engage in the sensing process, i.e., a method in which a dedicated transmitter engaging in the sensing process does not exist (un-coordinated CSI, passive radar).

Figure 5:
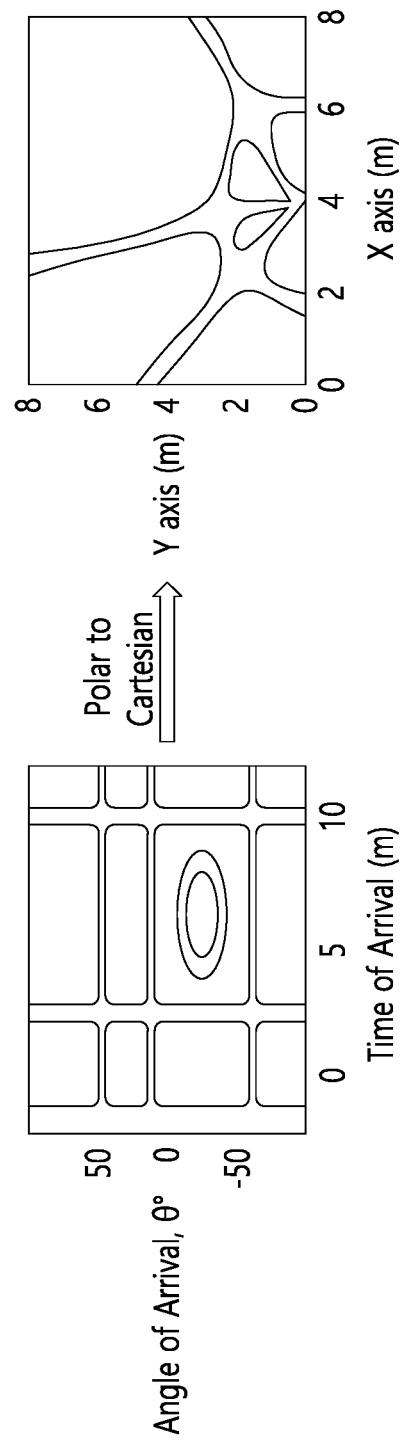
FIG. 5 shows indoor positioning using CSI-based WLAN sensing.

FIG. 5 shows indoor positioning using CSI-based WLAN sensing.

FIG. 5 uses CSI-based sensing for indoor positioning. Herein, an angle of arrival and a time of arrival are obtained by using the CSI, and, by converting the obtained angle of arrival and time of arrival to orthogonal coordinates, indoor positioning information may be obtained.

Figure 6:
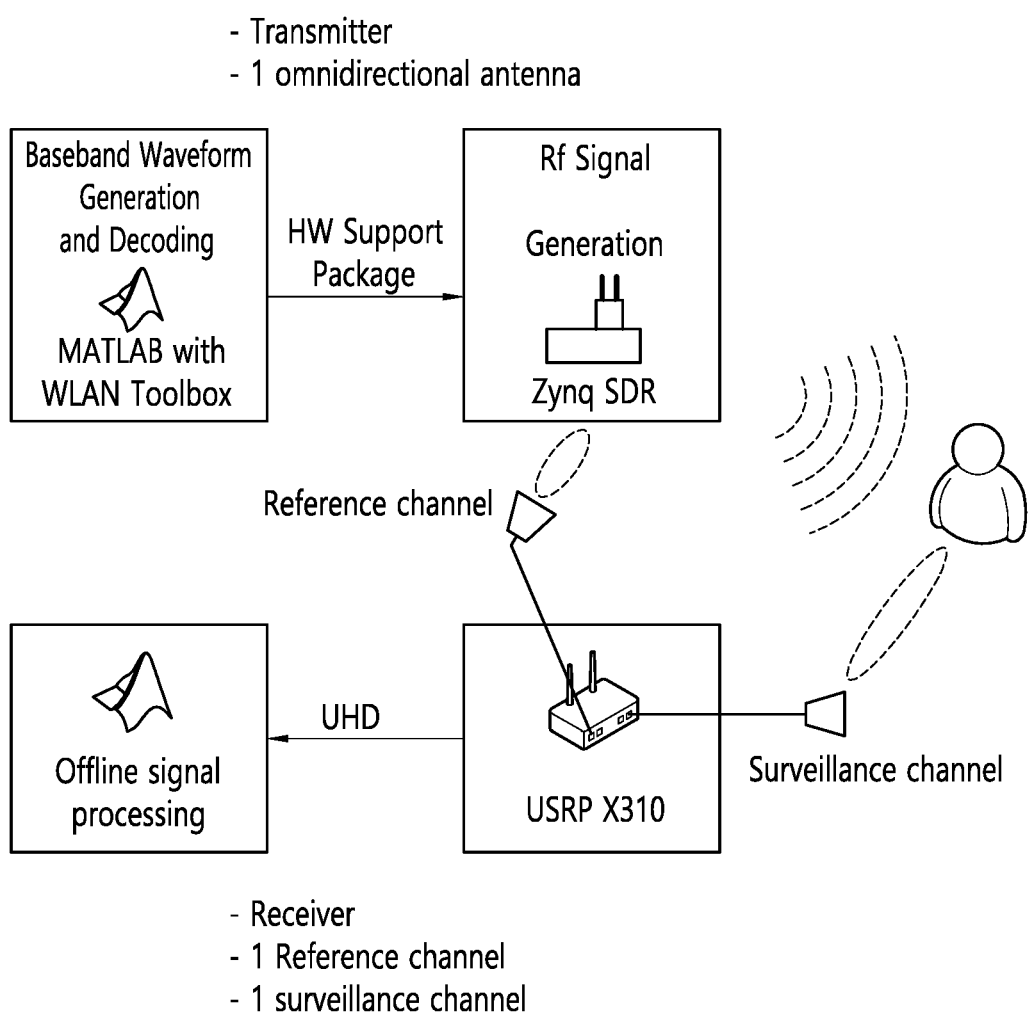
FIG. 6 is an exemplary implementation of a WLAN sensing device.

FIG. 6 is an exemplary implementation of a WLAN sensing device.

FIG. 6 is an implementation of a WLAN sensing device using MATLAB Toolbox, Zynq, USRP. The MATLAB Toolbox generates an IEEE 802.11ax WLAN signal, and an RF signal is generated by using a Zynq Software Defined Radio (SDR). The signal that has passed through a channel is received by a USRP SDR, and the MATLAB Toolbox performs sensing signal processing. Herein, it is assumed that one reference channel (a channel that can receive signals directly from a sensing transmitter) and one surveillance channel (a channel that can receive signals being reflected from an object) are used. According to an analysis performed by using a WLAN sensing device, a unique characteristic that is capable of identifying movement (or motion) or gestures was obtained.

During its initial development phase, the current IEEE 802.11bf WLAN sensing standardization process shall handle the cooperative sensing technology, which is expected to enhance sensing accuracy in the future, as a matter of importance. The key subjects of the standardization are expected to be a synchronization technology of sensing signals for cooperative sensing, CSI management and usage technology, sensing parameter negotiation and sharing technology, scheduling technology for CSI generation, and so on. Moreover, long-distance sensing technology, low-power sensing technology, sensing security and privacy protection technology, and so on, are also expected to be reviewed and considered as the main topics.

IEEE 802.11bf WLAN sensing is a type of radar technology that can use WLAN signals commonly existing at any time and in any place. The following table shows typical (or representative) IEEE 802.11bf usage examples. Accordingly, the IEEE 802.11bf WLAN sensing may be extensively used in our everyday lives, wherein the usage includes indoor detection, movement (or motion) detection, health care, 3D vision, various detections inside cars, and so on. Since the WLAN sensing is mostly used indoors, the motion range is within 10~20 meters, and the distance accuracy does not exceed a maximum range of 2 meters.

TABLE 2

| Name | details | Max range (m) | Key Performance Indicator | Range Accuracy (m) | Max Velocity (m/s)/ Velocity Accuracy | angular Accuracy (deg) |
|---|---|---|---|---|---|---|
| Room Sensing | presence detection, counting the number of people in the room | 15 | Number of Persons in Room | 0.5-2 | 2/0.1 | |
| Smart meeting room | presence detection, counting the number of people in the room, localization of active people | 10 | Location of persons in room | 0.5-2 | 1/0.1-0.3 | |
| Motion detection in a room | Detection of motion of in a room (of Human) | 10 | | | | |
| Home security | Detection of presence of intruders in a home | 10 | Detection of a person in a room | 0.5-2 | 3/0.1-0.3 | medium |
| Audio with user tracking | Tracking persons in a room and pointing the sound of an audio system at those people | 6 | Localization of persons to within 0.2m | 0.2 | 0.5/0.05 | 3 |
| Store Sensing | Counting number of people in a store, their location, speed of movement. Accuracy less important | 20 | Number and location of persons in store | 0.5-2 | 1/0.1-0.3 | 3 |
| Home Appliance Control | Tracking person and motion/ gesture detection | 10 | Gesture Detection | <1 | | |
| Gesture recognition - short range (finger movement) | Identification of a gesture from a set of gestures - range < 0.5 m | 0.5 | Gesture Detection | | 7 | 3 |
| Gesture recognition - medium range (hand movement) | Identification of a gesture from a set of gestures - range > 0.5 m | 2 | Gesture Detection | | | |

TABLE 2-continued

| Name | details | Max range (m) | Key Performance Indicator | Range Accuracy (m) | Max Velocity (m/s)/ Velocity Accuracy | angular Accuracy (deg) |
|---|---|---|---|---|---|---|
| Gesture recognition - large range (full body movement) | Identification of a gesture from a set of gestures - range > 2 m | 7 | Gesture Detection | 0.2 | 2/0.1 | 5 |
| Aliveliness detection | Determination whether a close by object is alive or not | 1 | Aliveliness Detection | 0.05 | | |
| Face/Body Recognition | Selection of the identity of a person from a set of known persons | 1 | Identity detection | 0.02 | | |
| Proximity Detection | Detection of object in close proximity of device | 0.5 | Object Detection | 0.02-2 | 1.5/0.2 | none |
| Home Appliance Control | Gesture Detection | 3 | Gesture Detection | <1 | 3/0.1 | |
| health care - Fall detection | Fall detection - abnormal position detection | 10 | | 0.2 | 3/0.1 | |
| Health case - remote diagnostics | measurements of breathing rate, heart rate etc. | 5 | Breathing rate accuracy/ Pulse Accuracy | 0.5 | 2/0.1 | |
| Surveillance/ Monitoring of elder people and/or children | Tracking person and presence detection | 10 | Detection and localization of person | 0.2-2 | 3/0.1 | |
| Sneeze sensing | Detecting and localizing the target human and sneeze droplet volume | 10 | Detection and localization of person and sneeze droplet volume | 0.2-0.5 | 20/0.1 | |
| 3d vision | building a 3d picture of an environment, using multiple STA | 10 | accuracy of 3d map (range, angle) | 0.01 | 5/0.1 | 2 |
| In car sensing - detection | detection of humans in car | 5 | Presence of Human in car | 0.1 | 1/0.1 | 3 |
| In car sensing | Driver sleepiness detection/ detection aid | 3 | Fast detection of driver sleepiness | 0.01 | 1/0.1 | 3 |

In IEEE 802.11, a technology that is capable of sensing movement (or motion) or gesture of an object (person or object) by using Wi-fi signals of various bands is being discussed. For example, it is possible to sense the movement (or motion) or gesture of an object (person or object) by using Wi-fi signals (e.g., 802.11ad or 802.11ay signals) of a 60 GHz band. Additionally, it is also possible to sense the movement (or motion) or gesture of an object (person or object) by using Wi-fi signals (e.g., 802.11ac, 802.11ax, 802.11be signals) of a sub-7 GHz band.

Hereinafter, technical characteristics of a PPDU according to the 802.11ay standard, which is one of Wi-fi signals of the 60 GHz band that may be used for WLAN sensing, will be described in detail.

Figure 7:
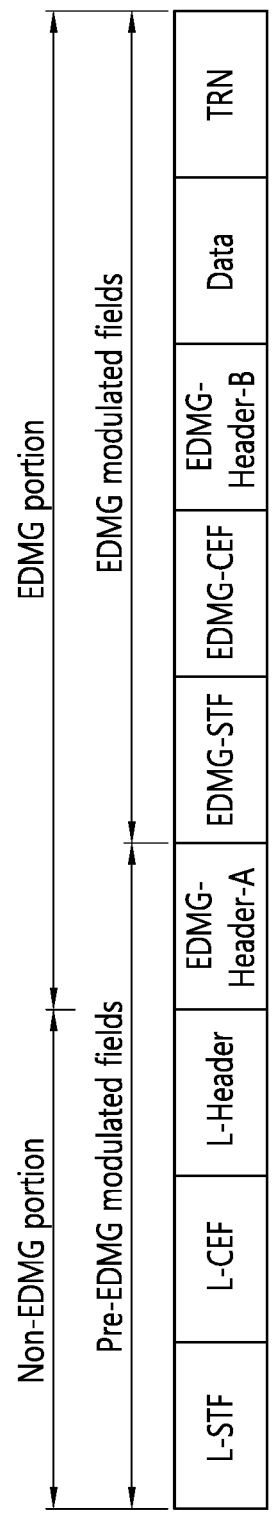
FIG. 7 is a diagram showing a simple PPDU structure that is supported in an 802.11ay WLAN system.

FIG. 7 is a diagram showing a simple PPDU structure that is supported in an 802.11ay WLAN system.

As shown in FIG. 7, a PPDU format that is applicable to an 802.11ay system may include L-STF, L-CEF, L-Header, EDMG-Header-A, EDMG-STF, EDMG-CEF, EDMG-Header-B, Data, TRN fields, and the aforementioned fields may be optionally included in accordance with the PPDU format (e.g., SU PPDU, MU PPDU, and so on).

Herein, a part including the L-STF, L-CEF, L-Header fields may be referred to as a Non-EDMG portion, and the remaining part may be referred to as an EDMG portion. Additionally, the L-STF, L-CEF, L-Header, EDMG-Header-A fields may be referred to as pre-EDMG modulated fields, and the remaining part (or fields) may be referred to as EDMG modulated fields.

The EDMG-Header-A field includes information that is required for demodulating an EDMG PPDU. The definition of the EDMG-Header-A field is the same as that of an EDMG SC mode PPDU and an EDMG OFDM mode PPDU. However, the definition of the EDMG-Header-A field is different from that of an EDMG control mode PPDU.

A structure of the EDMG-STF depends on a number of contiguous 2.16 GHz channels through which the EDMG PPDU is transmitted and index $i_{STS}$ of an $i_{STS}$-th space-time stream. For a single space-time stream EDMG PPDU transmission using an EDMG SC mode through a single 2.16 GHz channel, the EDMG-STF field does not exist. For an EDMG SC transmission, the EDMG-STF field shall be modulated by using pi/(2-BPSK).

A structure of the EDMG-CEF depends on a number of contiguous 2.16 GHz channels through which the EDMG PPDU is transmitted and a number of space-time streams $i_{STS}$. For a single space-time stream EDMG PPDU transmission using an EDMG SC mode through a single 2.16 GHz channel, the EDMG-CEF field does not exist. For an EDMG SC transmission, the EDMG-CEF field shall be modulated by using pi/(2-BPSK).

A (legacy) preamble part of the above-described PPDU may be used for packet detection, Automatic Gain Control (AGC), frequency offset estimation, synchronization), instruction for modulation (SC or OFDM), and channel estimation. The preamble format of the PPDU may be commonly applied for an OFDM packet and an SC packet. In this case, the preamble may be configured of a Short Training Field (STF) and a Channel Estimation (CE) field that is located after the STF.

Hereinafter, an example of a sensing frame format that is proposed for performing sensing at a 60 GHz band or WLAN sensing will be described in detail. A frame, packet, and/or data unit that is used for performing the sensing proposed in the present specification or the WLAN sensing may also be referred to as a sensing frame. The sensing frame may also be referred to by using other various terms, such as sensing measurement frame, sensing operation frame, and/or measurement frame, and so on.

FIG. 8 shows an example of a sensing frame format.

A Wi-Fi Sensing signal may be transmitted/received for channel estimation between an AP/STA and an STA by using a Wi-Fi signal of 60 GHz. At this point, in order to support backward capability with the existing 60 GHz Wi-Fi signal 802.11ad and 802.11ay, a sensing frame may be configured of a frame format that is shown in FIG. 8, which include a non-EDMG preamble portion (i.e., L-STF, L-CEF, L-Header).

As shown in FIG. 8, a sensing frame may be configured of L-STF, L-CEF, L-Header, EDMG-Header A, EDMG-STF, EDMG-CEF.

That is, since the sensing frame performs sensing on an STA or object by estimating a change in channel between Point to point (P2P) or point to multipoint (P2MP), unlike the conventional EDMG frame, the sensing frame may be configured without including a data field.

Since an EDMG frame may be transmitted by using one or more channels of a 60 GHz band (i.e., various channel bandwidths), as shown in FIG. 8, the sensing frame may be configured to include EDMG-STF and EDMG-CEF fields.

An STA/AP may perform accurate channel information measurement in a sensing transmission/reception bandwidth (BW) by using the EDMG-STF and EDMG-CEF fields.

Information on the BW that is used for the sensing may be transmitted through EDMG-header A. And, at this point, the corresponding information may be transmitted by using various BWs as shown below in the following table.

TABLE 3

| Index | BW |
|---|---|
| 1 | 2.16 GHz |
| 2 | 4.32 GHz |
| 3 | 6.48 GHz |
| 4 | 8.64 GHz |
| 5 | 2.16 + 2.16 GHz (non-contiguous) |
| 6 | 4.32 + 4.32 GHz (non-contiguous) |

Figure 9:
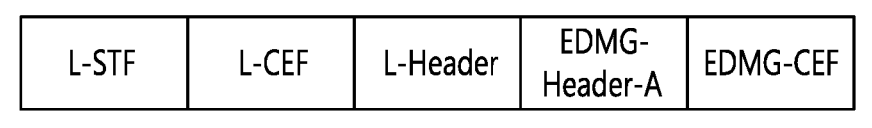

FIG. 9 shows another example of a sensing frame format.

Unlike what is described above, a sensing signal may be transmitted by using only a fixed BW (e.g., 2.16 GHz). And, in this case, since additional AGC, and so on, is/are not needed, the EDMG-STF may be omitted. When performing sensing by using only a predetermined BW, the EDMG-STF may be omitted, thereby configuring a sensing frame format, as shown in FIG. 9. Additionally, since only a predetermined BW is used, when performing sensing, unlike the conventional format, the EDMG-header may not include a BW field.

FIG. 10 shows yet another example of a sensing frame format.

At 60 GHz, an 802.11ay transmission basically transmits a signal by using beamforming. And, at this point, in order to configure an optimal beam between Tx and Rx, an antenna weight vector (AWV) is configured by using a training (i.e., TRN) field. Therefore, since the sensing frame transmits a signal by using a predetermined AWV, it is difficult for the sensing frame to accurately apply the changed channel situation. Therefore, in order to more accurately measure any change in the channel, the sensing frame may be configured to include the TRN field, as shown below. At this point, the information on the channel may be measured through the TRN field.

In FIG. 10, the sensing frame does not include a data field, and since the sensing frame performs channel measurement for the sensing by using the TRN, the above-described EDMG-CEF field for performing channel estimation may be omitted. Therefore, the sensing frame format may be configured as described below in FIG. 11.

FIG. 11 shows yet another example of a sensing frame format.

Hereinafter, the technical characteristics of a PPDU according to a Wi-fi signal of sub-7 GHz that may be used for WLAN sensing will be described in detail.

Hereinafter, an example of a sensing frame format that is proposed for sensing in a sub-7 GHz band or WLAN sensing will be described. For example, for the sensing according to the present specification, various PPDUs of 2.4 GHz, 5 GHz, 6 GHz bands may be used. For example, PPDUs according to the IEEE 802.11ac, 802.11ax, and/or 802.11be standard(s) may be used as the sensing frame.

Figure 12:
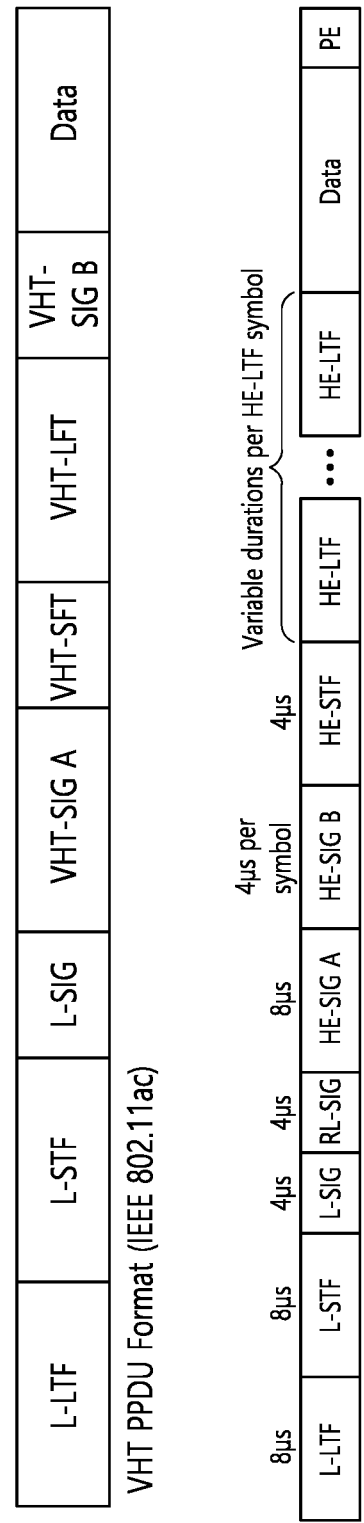
FIG. 12 shows another example of a sensing frame format.

FIG. 12 shows another example of a sensing frame format.

A sensing frame according to the present specification may use only part of the fields shown in FIG. 12. For example, a Data field shown in FIG. 12 may be omitted. Additionally, or alternatively, VHT-SIG B and/or HE-SIG B field(s) shown in FIG. 12 may be omitted.

Figure 13:
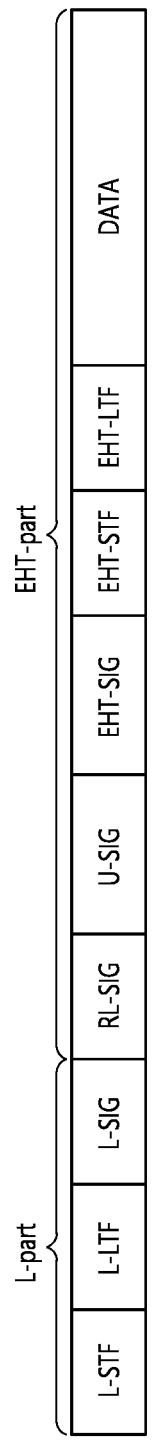
FIG. 13 shows another example of a sensing frame format.

FIG. 13 shows another example of a sensing frame format.

A sensing frame according to the present specification may use only part of the fields of an Extreme High Throughput (EHT) PPDU shown in FIG. 13. For example, a Data field shown in FIG. 13 may be omitted.

The PPDU of FIG. 13 may represent part or all of a PPDU type that is used in an EHT system. For example, the example of FIG. 13 may be used for both single-user (SU) mode and multi-user (MU) mode. In other words, the PPDU of FIG. 13 may be a PPDU for one receiving STA or a PPDU for multiple receiving STAs. When the PPDU of FIG. 13 is used for a Trigger-based (TB) mode, an EHT-SIG of FIG. 13 may be omitted. In other words, an STA that has received a Trigger frame for Uplink-MU (UL-MU) communication may transmit a PPDU, from which the EHT-SIG is omitted in the example of FIG. 13.

Subcarrier spacing of the L-LTF, L-STF, L-SIG, RL-SIG, U-SIG, and EHT-SIG fields of FIG. 13 may be determined as 312.5 kHz, and subcarrier spacing of the EHT-STF, EHT-LTF, Data fields may be determined as 78.125 kHz. That is, tone indexes (or subcarrier indexes) of the L-STF, L-LTF, L-SIG, RL-SIG, U-SIG, and EHT-SIG fields may be indicated in 312.5 kHz units, and tone indexes (or subcarrier indexes) of the EHT-STF, EHT-LTF, Data fields may be indicated in 78.125 kHz units.

In the PPDU of FIG. 13, L-LTF and L-STF may be the same as the fields of the prior art (or related art).

The L-SIG field of FIG. 13 may, for example, include 24 bits of bit information. For example, the 24-bit information may include a 4-bit Rate field, 1 Reserved bit, a 12-bit Length field, 1 bit of Parity bit, and 6 bits of Tail bits. For example, the 12-bit Length field may include information related to a PPDU length or time duration. For example, a value of the 12-bit Length field may be determined based on a type of the PPDU. For example, when the PPDU is a non-HT PPDU, an HT PPDU, a VHT PPDU, or an EHT PPDU, the value of the Length field may be determined as a multiple of 3. For example, when the PPDU is an HE PPDU, the value of the Length field may be determined as "a multiple of 3+1" or "a multiple of 3+2". In other words, a value of the Length field for a non-HT PPDU, an HT PPDU, a VHT PPDU, or an EHT PPDU may be determined as a multiple of 3, and a value of the Length field for an HE PPDU may be determined as "a multiple of 3+1" or "a multiple of 3+2".

The transmitting STA may generate an RL-SIG, which is generated identically as the L-SIG. The receiving STA may know that the received PPDU is an HE PPDU or EHT PPDU based on the presence (or existence) of an RL-SIG.

A Universal SIG (U-SIG) may be inserted after the RL-SIG of FIG. 13. The U-SIG may also be referred to by using various terms, such as a first SIG field, a first SIG, a first-type SIG, a control signal, a control signal field, a first (type) control signal, and so on.

The U-SIG may include N-bit information and may also include information for identifying the EHT PPDU type. For example, the U-SIG may be configured based on 2 symbols (e.g., two contiguous OFDM symbols). Each symbol (e.g., OFDM symbol) for the U-SIG may have a duration of 4 us. Each symbol of the U-SIG may be used for transmitting 26-bit information. For example, each symbol of the U-SIG may be transmitted/received based on 52 data tones and 4 pilot tones.

The U-SIG may be configured of 20 MHz units. For example, when an 80 MHz PPDU is configured, the U-SIG may be duplicated. That is, 4 identical U-SIGs may be included in the 80 MHz PPDU. A PPDU that exceeds the 80 MHz bandwidth may include different U-SIGs.

The EHT-SIG of FIG. 13 may include control information for the receiving STA. For example, the EHT-SIG may include a common field and a user-specific field. The common field may be omitted, and a number of user-specific fields may be determined based on a number of users. The common field may include RU allocation information. The RU allocation information may mean information related to the location of an RU to which multiple users (i.e., multiple receiving STAs) are allocated. The RU allocation information may be configured of 9-bit units. The user-specific field may include information for decoding at least one specified RU (e.g., STA ID information that is allocated to the corresponding RU, MCS index that is applied to the corresponding RU, LDPC/BCC coding type information that is applied to the corresponding RU, and so on) through the common field.

The EHT-STF of FIG. 13 may be used for enhancing automatic gain control estimation in a multiple input multiple output (MIMO) environment or OFDMA environment. And, the EHT-LTF of FIG. 13 may be used for estimating a channel in a MIMO environment or OFDMA environment.

Figure 14:
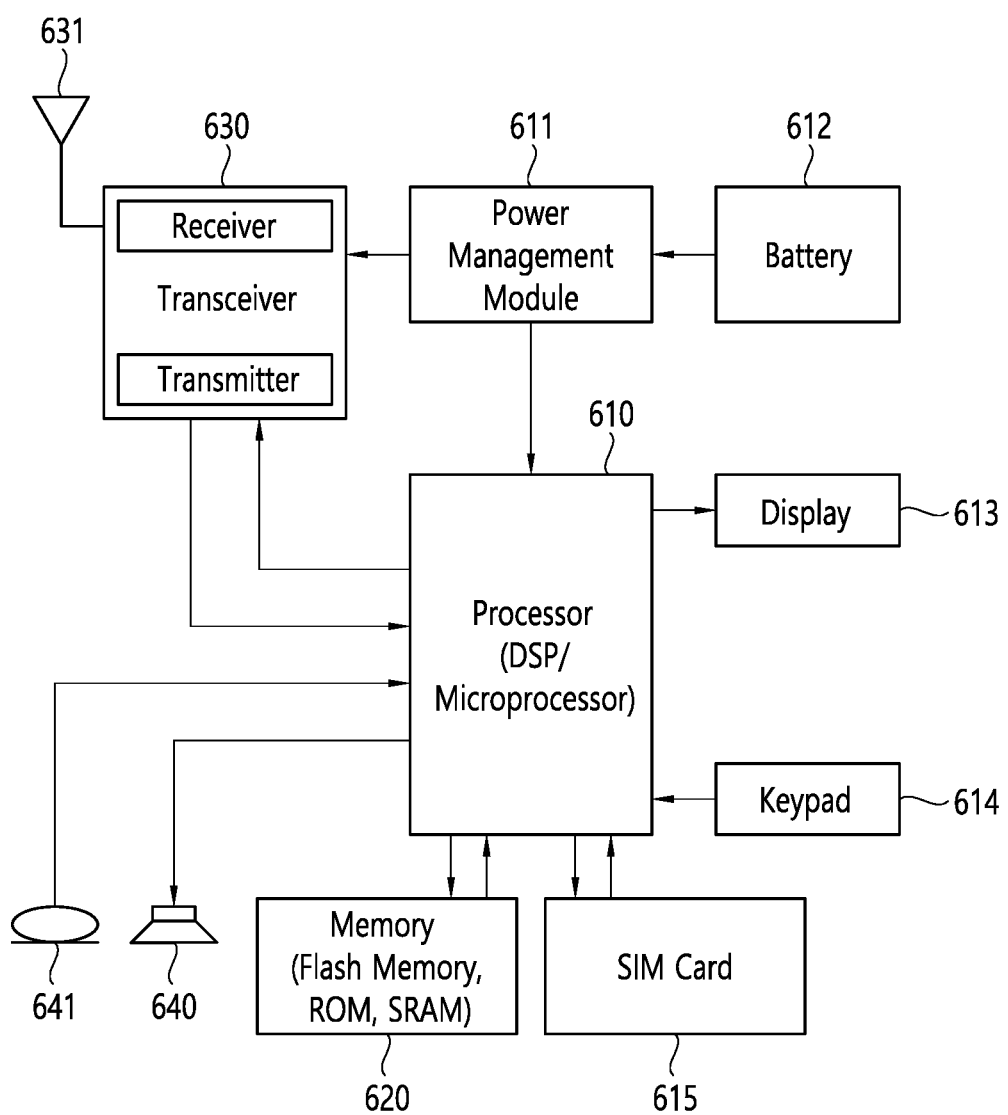
FIG. 14 shows a modified example of a transmitting device and/or receiving device of the present specification.

FIG. 14 shows a modified example of a transmitting device and/or receiving device of the present specification.

The device of FIG. 14 may be referred to by using other various terms, such as mobile terminal, wireless device, Wireless Transmit/Receive Unit (WTRU), User Equipment (UE), Mobile Station (MS), Mobile Subscriber Unit, or, simply, user, and so on. Additionally, the device of FIG. 14 may also be referred to by using other various terms, such as Base Station, Node-B, Access Point (AP), repeater, router, relay, and so on.

A processor 610 of FIG. 14 may instruct (or indicate) and control operations that are performed by the STA, transmitting STA, receiving STA, AP, non-AP, and/or user-STA according to the present specification. For example, the processor 610 may receive a signal from a transceiver 630, process the received signal (Rx signal), generate a transmission signal (Tx signal), and perform a control operation for transmitting the signal. The illustrated processor, memory, and transceiver may be implemented individually as separate chips, or at least two blocks/functions may be implemented through a single chip.

A memory 620 of FIG. 14 may store a signal that is received (i.e., Rx signal) through the transceiver 630 and may store a signal that is to be transmitted (i.e., Tx signal) through the transceiver 630. Additionally, the memory 620 of FIG. 14 may store a signal that is received (i.e., Rx signal) through the transceiver 630 and may store a signal that is to be transmitted (i.e., Tx signal) through the transceiver 630.

Referring to FIG. 14, a power management module 611 manages power for the processor 610 and/or the transceiver 630. A battery 612 supplies power to the power management module 611. A display 613 outputs a result processed by the processor 610. A keypad 614 receives inputs that are to be used by the processor 610. The keypad 614 may be displayed on the display 613. A SIM card 615 may be an integrated circuit that is used to securely store an international mobile subscriber identity (IMSI) and its related key, which are used to identify and authenticate subscribers on mobile telephony devices, such as mobile phones and computers.

Referring to FIG. 14, a speaker 640 may output a result related to a sound processed by the processor 610. And, a microphone 641 may receive an input related to a sound that is to be used by the processor 610.

Hereinafter, multiple channel/resource-based WLAN sensing that is proposed in the present specification will be described in detail. The WLAN sensing that is proposed in the present specification may be performed by at least one transmitting STA and multiple receiving STAs. Herein, the at least one transmitting STA may be an AP, initiator, sensing initiator. Additionally, the multiple receiving STAs may be user STAs, responders, sensing responders. The STA of the present specification may also be referred to by various terms (e.g., first/second STA(s)) other than the above-described terms. In the following example, although the AP operates as a transmitting STA and the user STA operates as a receiving STA, the example of the present specification may be variously changed. The STA of the present specification may also be referred to by various terms (e.g., first/second STA(s)) other than the above-described terms. Additionally, the sensing or sensing operation of the present specification may mean operations of the transmitting STA/receiving STA for part or all of the discovery, negotiation, measurement exchange, and tear down processes of FIG. 3. The operations may include transmission and/or reception of signals for the sensing, measurement for the sensing, and so on.

In order to enhance accuracy and resolution of the WLAN sensing, a WLAN sensing using a link connection between multiple receiving STAs (e.g., multiple user STAs, multiple responders, or multiple sensing STAs) and at least one transmitting STA (e.g., AP, initiator, or sensing initiator) may be considered. Hereinafter, for an efficient WLAN sensing, a WLAN sensing for multiple channels or multiple frequency resources according to a frequency band will be described in detail. At this point, the frequency band is not a limitation of the WLAN sensing that is described in the present specification. For example, technical characteristics of a WLAN sensing for a sub-7 GHz band, which will be described later on, may be applied to a WLAN sensing for a 60 GHz band. Also, technical characteristics of a WLAN sensing for a 60 GHz band, which will be described later on, may be applied to a WLAN sensing for a sub-7 GHz band.

Information, frame, and signal that are described in the present specification may be transmitted/received in part or all of the WLAN sensing procedure of FIG. 3. Alternatively, the information, frame, and signal may be transmitted/received in part or all of an association procedure.

Technical characteristic 1: Hereinafter, technical characteristics of WLAN sensing for the sub-7 GHz band will be described. Herein, for example, the sub-7 GHz band of the present specification may include the related art 2.4 GHz band, 5 GHz band, 5.9 GHz band, 6 GHz band, and so on. For example, various formats/types of PPDUs that are defined in the IEEE 802.11a/b/g/n/ac/ax/be standards may be used over the sub-7 GHz band. More specifically, the sensing operation that will hereinafter be described in detail may be performed through a PPDU defined by the IEEE 802.11a/b/g/n/ac/ax/be standards that are transmitted/received in the sub-7 GHz band. For example, a sensing unit that will hereinafter be described may be included in the various types of PPDUs, the receiving STA may perform sensing on a channel based on the sensing unit, and the sensing result may be transmitted to the transmitting STA.

Technical characteristic 1.A: When performing the WLAN sensing, the transmitting STA may perform sensing by using bandwidths of various sizes for the sensing (or WLAN sensing) procedure. For example, the bandwidth may include 20, 40, 80, 160, 320 MHz.

Technical characteristic 1.A.i: A sensing unit in which the WLAN sensing is performed may be various configured. Herein, the sensing unit may mean a resource unit according to which the receiving STA performs sensing. The sensing unit may be allocated to the receiving STA by the transmitting STA. For example, the sensing unit may include a subchannel. Alternatively, the sensing unit may include a resource unit (RU). Herein, a size of the subchannel and a size of the RU may be variously configured. For example, the subchannel unit may include 20, 40, 80 MHz subchannels. Additionally, the RU unit may include 242, 484, 996 RUs. In the present specification, a technical characteristic that is described for a subchannel in the sensing unit may also be applied to another sensing unit (e.g., RU). Similarly, in the present specification, a technical characteristic that is described for an RU in the sensing unit may also be applied to another sensing unit (e.g., subchannel).

Technical characteristic 1.A.i.1: The transmitting STA may transmit information on the sensing unit to a receiving STA. The information on the sensing unit may be transmitted in the discovery process or negotiation process of FIG. 3. For example, the information on the sensing unit may be transmitted to a receiving STA within a basic service set (BSS) through a beacon frame that is used for a WLAN. Alternatively, the information on the sensing unit may be transmitted to receiving STAs through a sensing initiation request frame. Herein, the information on the sensing unit may be transmitted along with information on a number of subchannels being used for sensing and channel index information. The sensing initiation request frame may be a frame that is used for part or all of the WLAN sensing procedure of FIG. 3. For example, the sensing initiation request frame may be a frame that is used in the discovery process or negotiation process of FIG. 3. Herein, the sensing initiation request frame may be configured of various versions of PPDUs. For example, the sensing initiation request frame may be configured based on a VHT-PPDU, an HE-PPDU, and/or an EHT-PPDU.

Technical characteristic 1.A.i.2: Additionally, when the receiving STA associates with the transmitting STA, the receiving STA may receive information on the sensing unit through a frame that is used for the association. For example, the frame may be an association request frame, an association response frame, or a reassociation request frame.

Technical characteristic 1.A.ii: The number of receiving STAs that perform sensing may be determined by various methods. For example, the number of receiving STAs that perform sensing may be determined in accordance with a number of sensing units that are available within the bandwidth (e.g., a number of subchannels or a number of RUs).

Technical characteristic 1.A.ii.1: For example, when a bandwidth that is used for sensing is 80 MHz, and when the sensing unit is a 20 MHz subchannel, the number of receiving STAs simultaneously performing sensing during one session of the sensing operation may be equal to 4. Alternatively, when a bandwidth that is used for sensing is 160 MHz, and when the sensing unit is a 20 MHz subchannel, the number of receiving STAs simultaneously performing sensing during one session of the sensing operation may be equal to 8. Herein, the one session of the sensing operation may mean part or all of the above-described processes of FIG. 3 being performed once.

Figure 15:
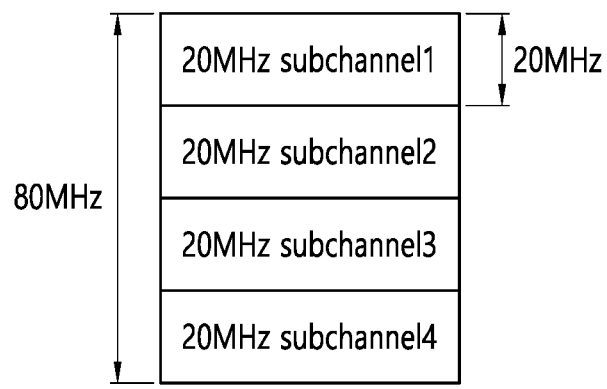
FIG. 15 shows an example where a bandwidth that is wider than 20 MHz is used for sensing.
Figure 15:
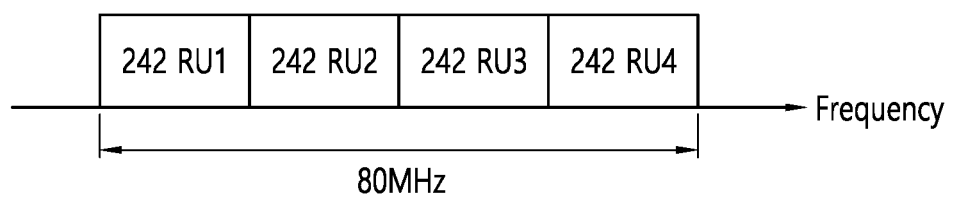

FIG. 15 shows an example where a bandwidth that is wider than 20 MHz is used for sensing. More specifically, 1510 of FIG. 15 shows a case where the bandwidth that is used for sensing is 80 MHz and the sensing unit is a 20 MHz subchannel. Additionally, 1520 of FIG. 15 shows a case where the bandwidth that is used for sensing is 80 MHz and the sensing unit is 242 RU.

In 1510 of FIG. 15, 20 MHz subchannel 1 to 20 MHz subchannel 4 may each be allocated to 4 different receiving STAs. Additionally, in 1520 of FIG. 15, 242 RU1 to 242 RU4 may each be allocated to 4 different receiving STAs.

Technical characteristic 1.B: When performing WLAN sensing, the transmitting STA may allocate, to a receiving STA, a channel or frequency resource through which the receiving STA is to perform the sensing operation. When performing sensing negotiation or initiation, the channel or frequency resource may be allocated through a signal that is transmitted to the receiving STA. Herein, the sensing negotiation or initiation may be part or all of the WLAN sensing procedure of FIG. 3. For example, the sensing negotiation or initiation may be an operation that is performed during the negotiation process of FIG. 3.

Technical characteristic 1.B.i: Information on the sensing unit (e.g., information on the subchannel and/or RU) may be combined with information on the receiving STA by using various methods. Herein, the information on the receiving STA may include information for identifying the receiving STA. For example, the information for identifying the receiving STA may be an identifier that is allocated to the receiving STA. Therefore, the information on the sensing unit may indicate a specific receiving STA and a sensing unit that is allocated to the specific receiving STA.

Technical characteristic 1.B.i.1: For example, the combination of information according to the above-described Technical characteristic 1.B.i may be configured as a combination of STA-identifier (ID) and subchannel index, or a combination of STA-ID and resource unit allocation (RA). Herein, the STA-ID may be configured by using various methods. For example, the STA-ID may include all or part of an association ID (AID) of the receiving STA. Additionally, the RA may mean a field indicating the sensing unit. The field may be configured by using various methods. For example, the RA may be RU allocation information or RU allocation subfield being included in the common field of the EHT-SIG of FIG. 13.

Technical characteristic 1.B.i.2: The combined information may be transmitted to the receiving STA. For example, the combined information may be transmitted through a sensing request frame or a sensing initiation request frame. In the present specification, the sensing request frame or sensing initiation request frame may be one of the signals being used in part or all of the WLAN sensing procedure of FIG. 3.

Technical characteristic 1.C: In order to allocate an optimal sensing unit (e.g., subchannel or RU) to the receiving STA, the sensing unit may be periodically or aperiodically changed. For example, the subchannel and RU for sensing may be changed each time the sensing operation is performed. Alternatively, the subchannel and RU for sensing may be changed at a consistent cycle period. Herein, the information on the sensing unit and/or the combined information may be periodically or aperiodically transmitted to the receiving STA.

Technical characteristic 1.C.i: An available subchannel may be periodically or aperiodically changed. Therefore, the information on the sensing unit may be periodically or aperiodically transmitted to the receiving STA. For example, the available subchannel may be changed at each transmission cycle of the beacon frame. At this point, the information on the sensing unit may be transmitted at each transmission cycle of the beacon frame.

Technical characteristic 1.C.ii: In order to allocate an optimal subchannel or RU to the receiving STA, the following signals may be transmitted/received. Herein, the signals that will hereinafter be described may be one of the signals that are used in the WLAN sensing procedure or association procedure of FIG. 3.

Technical characteristic 1.C.ii.1: For example, when a subchannel is used as the sensing unit (or sensing operation unit), the following technical characteristics may be applied. The technical characteristics that will hereinafter be described may also be applied to a case where an RU is used as the sensing unit.

Technical characteristic 1.C.ii.1.A: When the receiving STA is associated with the transmitting STA, the transmitting STA may allocate a subchannel to a receiving STA having sensing capability through an association frame. Herein, the association frame may be a frame that is used when the receiving STA is associated with the transmitting STA. Since the subchannel is allocated by using an association frame, the allocated subchannel may be used without any change (or modification) within the BSS.

Technical characteristic 1.C.ii.1.B: When multiple receiving STAs exist within the BSS, a same subchannel may be allocated for sensing to multiple receiving STAs. At this point, receiving STAs being allocated with the same subchannel may not be included in the same sensing procedure.

Technical characteristic 1.C.ii.1.C: A same subchannel may be allocated to different receiving STAs. At this point, when performing the sensing operation, in order to indicate the performance of the sensing operation to a receiving STA that is performing sensing, the transmitting STA may add a field including information on the receiving STA that is performing sensing, e.g., a field including identification information to a sensing initiate frame or sensing initiation request frame. The sensing initiate frame or sensing initiation request frame may be a frame that is used in the WLAN sensing procedure of FIG. 3.

Technical characteristic 1.C.ii.1.C.i: The sensing initiate frame or sensing initiation request frame may include a field for a group-ID for sensing grouping. At this point, in order to allocated the group-ID, a Management frame or Control frame that is used for the WLAN may be used as the sensing initiate frame or sensing initiation request frame. Herein, the group-ID may mean an identifier for identifying or grouping at least one receiving STA that is/are related to the WLAN sensing. In the present specification, the group-ID may be referred to by using various terms. For example, the group-ID may also be referred to by using various terms, such as Sensing Group ID, sensing ID, transmission ID, reception ID, and so on.

Technical characteristic 1.C.ii.1.C.ii: The sensing initiate frame or sensing initiation request frame may be transmitted/received through a predetermined (or pre-pended) channel. The sensing initiate frame or sensing initiation request frame may be a frame that is used in the WLAN sensing procedure of FIG. 3. For example, the predetermined (or pre-pended) channel may be a primary channel. The sensing initiate frame or sensing initiation request frame may be transmitted/received through a primary channel (e.g., primary 20 MHz channel).

Technical characteristic 1.C.ii.1.C.iii: A receiving STA that has obtained sensing unit information being allocated through the predetermined (or pre-pended) channel may perform sensing measurement and feedback through the corresponding channel. In other words, a channel receiving the sensing unit information, a channel performing sensing measurement, and a channel transmitting feedback information may be the same channel. Herein, the sensing measurement and feedback may be part of the processes of the WLAN sensing procedure of FIG. 3.

Technical characteristic 1.C.ii.1.D: The above-described technical characteristic(s) may be variously changed. For example, a channel performing sensing measurement and/or a channel transmitting feedback information may be a secondary channel (or non-primary channel). The above-described secondary channel (or non-primary channel) may be allocated based on Sub-channel Selective Transmission (SST). For example, the receiving STA may obtain information on a specific secondary channel (or non-primary channel) based on the SST. The receiving STA may perform sensing management and/or feedback through a channel that is obtained based on the obtained channel. For example, information on a viewpoint where the receiving STA performs sensing measurement and/or feedback may be indicated based on the SST.

Technical characteristic 1.C.ii.2: When an RU (e.g., 242/484/996 RU, and so on) is used as the sensing unit, the following technical characteristics may be applied. However, the technical characteristics that will hereinafter be described may also be applied to a case where a subchannel is used as the sensing unit.

Technical characteristic 1.C.ii.2.A: A PPDU for sensing may be configured of a format that corresponds to a bandwidth for WLAN sensing. For example, when a bandwidth of 80/160 MHz is used for sensing, the PPDU for sensing may be configured as an 80 MHz PPDU/160 MHz PPDU for the corresponding bandwidth. For example, when a sensing unit is allocated as a specific RU unit, the bandwidth of the PPDU may be determined in accordance with the size of the corresponding RU. For example, when 996-RU is used as the sensing unit, the transmitting STA may transmit an 80 MHz PPDU as the measurement frame. A common control field (e.g., SIG-A field or U-SIG field) of the corresponding PPDU may include information on the whole bandwidth (e.g., 80 MHz) of the PPDU.

Technical characteristic 1.C.ii.2.B: Information on an RU that is to perform sensing may be transmitted by using various methods. For example, the information on the RU that is to perform sensing may be transmitted to the corresponding receiving STAs through RU allocation information. The information on the RU that is to perform sensing may be transmitted through a SIG field. Additionally, the information on the RU that is to perform sensing may be transmitted through a signal that is used for the WLAN sensing procedure of FIG. 3.

Technical characteristic 1.C.ii.2.B.i: For example, when an 11ax/11be frame format is used as the measurement frame, the information may be transmitted through a common field of HE-SIG-B/common field of EHT-SIG. In other words, a measurement frame that is transmitted by a transmitting STA may be configured of various types of PPDUs (e.g., an NPD type PPDU), and the information on the RU that is to perform sensing may be included in the common field of HE-SIG-B and/or the common field of EHT-SIG.

Technical characteristic 1.C.ii.2.B.ii: When the above-described technical characteristic is used, depending upon the channel situation, a specific RU within the bandwidth may be allocated to each receiving STA. Therefore, an optimal RU may be allocated to the receiving STA for signals transmission/reception. Furthermore, accuracy in the sensing operation may be enhanced.

Technical characteristic 1.D: For example, when a 20/40 MHz subchannel is used as the sensing unit, a signal (e.g., an NDP type PPDU or other various types of PPDUs) that is transmitted to the receiving STA when performing the sensing operation may be configured as a 20/40 MHz PPDU corresponding to the sensing unit.

Technical characteristic 1.D.i: The signal that is transmitted to the receiving STA when performing the sensing operation may be transmitted by using various PPDU formats. Herein, a PPDU that is transmitted through multiple subchannels may be configured of single-user (SU)/multi-user (MU) PPDU formats of the same format/version. At this point, among the fields that are included in the PPDU, part or all of the content may be different configured per subchannel. A detailed example of differently configuring the content being included in each subchannel may hereinafter be described in detail.

Technical characteristic 1.D.i.1: The bandwidth of a SIG field of a PPDU that is transmitted through each subchannel may be configured in units of sensing unit. At this point, the SIG field may include HE-SIG-A, and U-SIG.

Technical characteristic 1.D.i.2: For example, a signal for sensing may be configured based on an 11ax/11be PPDU format. At this point, the PPDU format that is being transmitted through each subchannel may be configured as a PPDU format of the 11ax/11be standard. Technical characteristic 1.D.i.3: For example, when the bandwidth that is used for sensing is 80 MHz and the sensing unit is a 20 MHz subchannel, the PPDU that is being transmitted through the bandwidth may be configured by using various PPDU formats.

Figure 16:
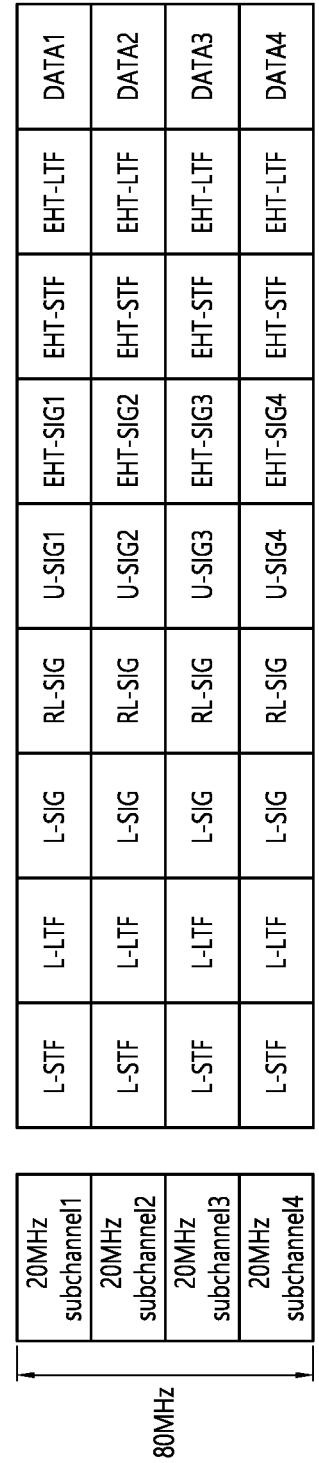
FIG. 16 shows an example where the bandwidth that is used for sensing is 80 MHz and where a sensing unit is configured of 20 MHz subchannels.

Technical characteristic 1.D.i.3.A: For example, when the signal for sensing is configured of an 11be PPDU format, the signal may be configured as described below. FIG. 16 shows an example of an EHT PPDU that is used for sensing. The example of FIG. 16 may also be applied to another PPDU format. The example of FIG. 16 may include the content of the above-described Technical characteristic 1.D.i.1 to Technical characteristic 1.D.i.3.

FIG. 16 shows an example where the bandwidth that is used for sensing is 80 MHz and where a sensing unit is configured of 20 MHz subchannels. Referring to FIG. 16, 20 MHz subchannel 1 to 20 MHz subchannel 4 may be configured for the bandwidth. The EHT PPDU of FIG. 16 may represent part or all of the PPDU types that are used in an EHT system.

Subcarrier spacing of the L-LTF, L-STF, L-SIG, RL-SIG, U-SIG, and EHT-SIG fields of FIG. 16 may be determined as 312.5 kHz, and subcarrier spacing of the EHT-STF, EHT-LTF, Data fields may be determined as 78.125 kHz. That is, tone indexes (or subcarrier indexes) of the L-STF, L-LTF, L-SIG, RL-SIG, U-SIG, and EHT-SIG fields may be indicated in 312.5 kHz units, and tone indexes (or subcarrier indexes) of the EHT-STF, EHT-LTF, Data fields may be indicated in 78.125 kHz units.

Referring to FIG. 16, a PPDU corresponding to the Subchannel 1, Subchannel 2, Subchannel 3, and Subchannel 4 may be configured. The L-STF, L-LTF, L-SIG, RL-SIG that are included in the PPDU may be identically configured in 20 MHz units for the Subchannel 1, Subchannel 2, Subchannel 3, and Subchannel 4.

Additionally, the U-SIG and EHT-SIG that are included in the PPDU may be differently configured in 20 MHz units for each of the Subchannel 1, Subchannel 2, Subchannel 3, and Subchannel 4. The U-SIG/EHT-SIG corresponding to the Subchannel 1 may be referred to as U-SIG1/EHT-SIG1. The U-SIG/EHT-SIG corresponding to the Subchannel 2 may be referred to as U-SIG2/EHT-SIG2. The U-SIG/EHT-SIG corresponding to the Subchannel 3 may be referred to as U-SIG3/EHT-SIG3. And, the U-SIG/EHT-SIG corresponding to the Subchannel 4 may be referred to as U-SIG4/EHT-SIG4. For example, the U-SIG1 of FIG. 16 may include information on the bandwidth (e.g., 20 MHz), and the EHT-SIG-1 of FIG. 16 may include allocation information on at least one RU (e.g., at least one RU being included in Data1 of FIG. 16) (e.g., information for decoding the corresponding RU) being included in the Subchannel 1.

Technical characteristic 1.D.i.3.B: For example, the PPDU may be configured by using the 11ac/11ax PPDU format. For example, when the 11ax PPDU format is used, instead of the U-SIG, EHT-SIG, EHT-STF, EHT-LTF of the PPDU of FIG. 16, HE-SIG-A, HE-SIG-B, HE-STF, HE-LTF may be included in the corresponding PPDU. Herein, the HE-SIG-B may be omitted.

Technical characteristic 1.D.i.3.C: Among the signals (or frames) being used in the sensing procedure, part or all may not be included in the Data field. For example, a measurement frame may be configured of a null data packet (NDP) frame. That is, DATA1, DATA2, DATA3, and DATA4 that are shown in FIG. 16 may be omitted. In the present specification, the sensing frame may be one of the signals that are transmitted, by the transmitting STA, to the receiving STA during the WLAN sensing procedure of FIG. 3. Alternatively, the sensing frame may be one of the signals that are transmitted, by the receiving STA, to the transmitting STA during the WLAN sensing procedure of FIG. 3.

Technical characteristic 1.E: For example, the transmitting STA may transmit a sensing request frame or measurement frame to multiple receiving STAs at the same time. Additionally, the transmitting STA may receive a measurement frame or feedback frame from multiple receiving STAs at the same time. In the present specification, the sensing request frame, measurement frame, and feedback frame may be one of the signals being used during the WLAN sensing procedure of FIG. 3. At this point, the Technical characteristic 1.E may be applied to a case where multiple subchannels or RUs are being used.

Technical characteristic 1.F: According to the capability of the receiving STA, when performing the sensing operation, subchannels or RUs having different sizes may be allocated to multiple receiving STAs. That is, the frame that is used in the sensing procedure may be transmitted/received through multiple receiving STAs each having a different subchannel or RU size.

Technical characteristic 1.F.i: According to the size of the bandwidth through which the sensing is performed, a subchannel may be configured by using various methods. The following technical characteristics are merely exemplary. And, therefore, the embodiment of the present specification shall not be limited only to the example that will hereinafter be described.

Technical characteristic 1.F.i.1: For example, the multiple subchannels being configured for the bandwidth through which the sensing is performed may have different sizes. Additionally, the corresponding PPDU may be configured according to the size of the subchannel(s).

Figure 17:
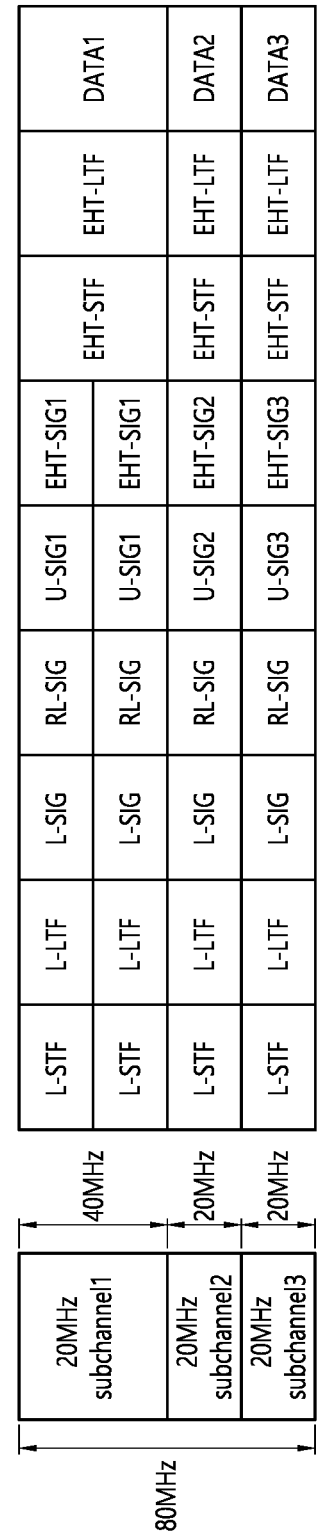
FIG. 17 shows an example of configuring a subchannel, when the size of a bandwidth is 80 MHz.

FIG. 17 shows an example of configuring a subchannel, when the size of a bandwidth is 80 MHz. More specifically, FIG. 17 shows an example where the bandwidth performing sensing is 80 MHz, and where Subchannel 1 having a size of 40 MHz, Subchannel 2 having a size of 20 MHz, and Subchannel 3 having a size of 20 MHz are configured.

Referring to FIG. 17, a PPDU corresponding to the Subchannel 1, Subchannel 2, and Subchannel 3 may be configured. The L-STF, L-LTF, L-SIG, RL-SIG that are included in the PPDU may be identically configured in 20 MHz units for the Subchannel 1, Subchannel 2, and Subchannel 3. Herein, the PPDU corresponding to the Subchannel 1 may include 2 sets of the L-STF, L-LTF, L-SIG, RL-SIG.

Additionally, the U-SIG and EHT-SIG that are included in the PPDU may be differently configured in 20 MHz units for each of the Subchannel 1, Subchannel 2, and Subchannel 3. The U-SIG/EHT-SIG corresponding to the Subchannel 1 may be referred to as U-SIG1/EHT-SIG1. The U-SIG/EHT-SIG corresponding to the Subchannel 2 may be referred to as U-SIG2/EHT-SIG2. And, the U-SIG/EHT-SIG corresponding to the Subchannel 3 may be referred to as U-SIG3/EHT-SIG3. Herein, the U-SIG1 corresponding to Subchannel 1 may be duplicated. That is, the PPDU corresponding to Subchannel 1 may include two U-SIG1s.

U-SIG1 shown in FIG. 17 may include information on the bandwidth (i.e., 40 MHz) of Subchannel 1, U-SIG3 shown in FIG. 17 may include information on the bandwidth (i.e., 20 MHz) of Subchannel 2, and U-SIG4 shown in FIG. 17 may include information on the bandwidth (i.e., 20 MHz) of Subchannel 3. Additionally, the EHT-STF, EHT-LTF, and Data field that are included in the PPDU may be configured in units corresponding to the sizes of the Subchannel 1, Subchannel 2, and Subchannel 3. That is, the EHT-STF, EHT-LTF, and Data field corresponding to Subchannel 1 may be configured in 40 MHz units. In other words, the EHT-STF corresponding to Subchannel 1 is generated based on a 40 MHz STF sequence, and the EHT-LTF corresponding to Subchannel 1 is generated based on a 40 MHz LTF sequence. Additionally, the EHT-STF, EHT-LTF, and Data field corresponding to Subchannel 2 and Subchannel 3 may be configured in 20 MHz units. In other words, each the EHT-STFs corresponding to Subchannels 2/3 is generated based on a 20 MHz STF sequence, and each of the EHT-LTFs corresponding to Subchannels 2/3 is generated based on a 20 MHz LTF sequence. However, FIG. 17 is merely exemplary. And, therefore, the individual size of each subchannel may be variously changed.

Technical characteristic 1.F.i.2: Among the frames that are used for the WLAN sensing procedure of FIG. 3, a sensing frame that does not include a Data field may exist. For example, a measurement frame may be configured of an NDP frame. For example, the DATA1, DATA2, DATA3 that are indicated in the example shown in FIG. 17 may be omitted. Herein, the measurement frame may be a frame that is used during a Measurement Exchange process of the WLAN sensing procedure of FIG. 3.

Technical characteristic 2: WLAN sensing for a 60 GHz band

Figure 18:
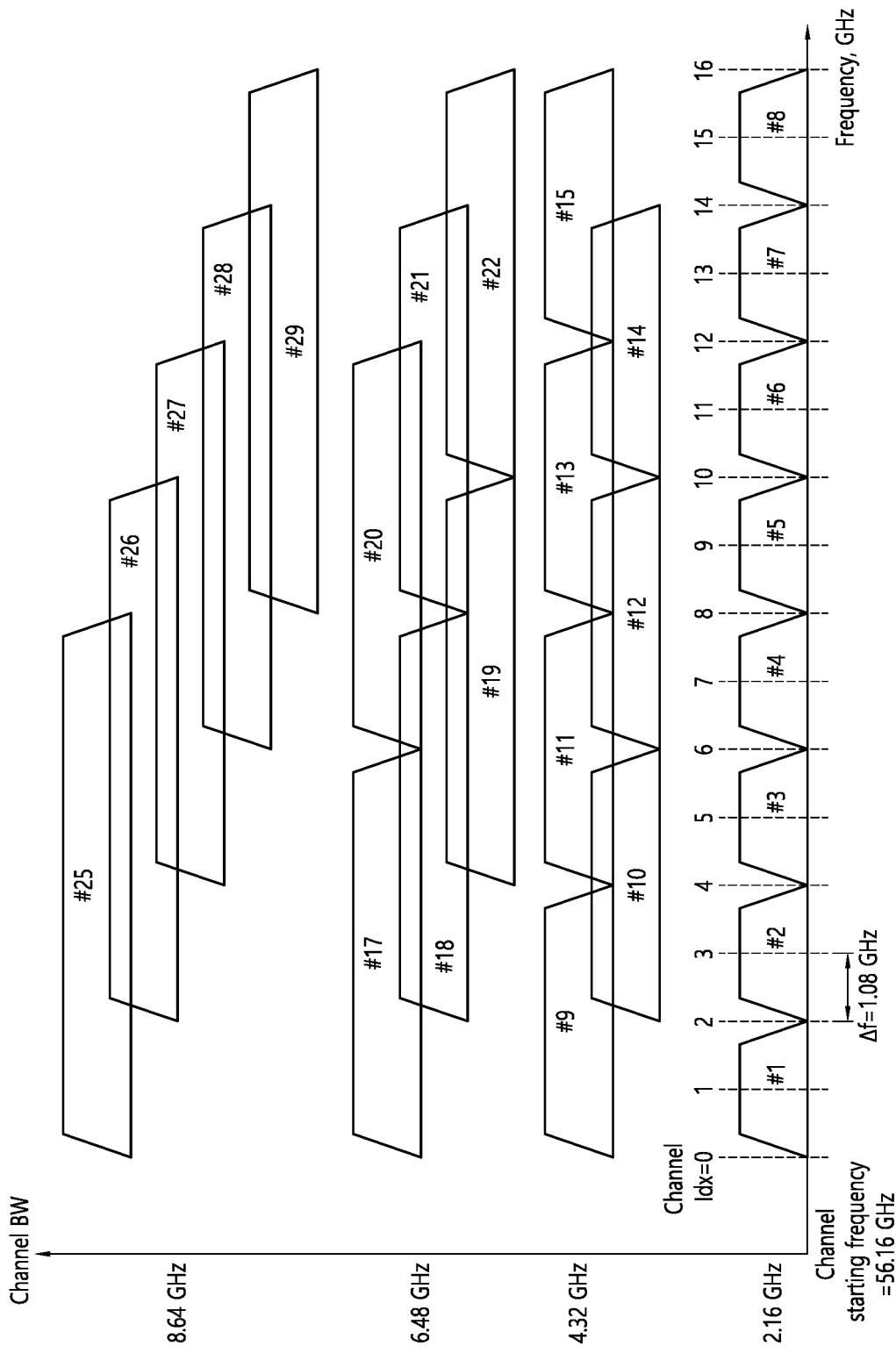
FIG. 18 shows an example of channelization.

Technical characteristic 2.A: Various types of channelization may be supported in a 60 GHz band. FIG. 18 shows an example of channelization.

The transmitting STA/receiving STA may use a channel that is shown in FIG. 18. Each trapezoid shown in FIG. 18 may mean a channel position. Numbers that are indicated at the center of the trapezoids shown in FIG. 18 may be channel numbers. Additionally, among 2.16 GHz channels, Channel number 2, and, among 4.32 GHz channels, Channel number 10 may be configured as the primary channels, and the remaining channels may be optional channels.

Technical characteristic 2.A.i: For example, one channel performing sensing may be configured of 2.16 GHz subchannels. At this point, multiple subchannels may be used. For example, a maximum number of the multiple subchannels may be equal to 8. Herein, one or more contiguous subchannels may be bonded or aggregated.

Technical characteristic 2.A.ii: When performing WLAN sensing at a 60 GHz band, in order to perform signal transmission/reception to/from multiple receiving STAs, the transmitting STA may use sensing channel units (or sensing units) of various sizes. For example, the sensing unit may be a 2.16 MHz, 4.32 MHz, 6.48 MHz, or 8.64 MHz subchannel. At this point, the sensing units may not overlap one another.

Technical characteristic 2.A.iii: For example, when the sensing unit is a 2.16 MHz subchannel, a maximum of 8 non-overlapping subchannels may be used for sensing. At this point, the transmitting STA may simultaneously transmit/receive sensing signals to/from a maximum of 8 receiving STAs.

Technical characteristic 2.B: The receiving STA may receive information on subchannels performing the sensing operation by using the following method. For example, the receiving STA may obtain the information when the receiving STA is associated with the transmitting STA. Alternatively, the receiving STA may obtain the information when performing the WLAN sensing procedure of FIG. 3.

Technical characteristic 2.B.i: For example, information on the sensing channel unit or sensing unit may be transmitted through a beacon frame. The sensing unit may be changed in units of a beacon period. Additionally, whether or not a change occurs in the sensing unit may be indicated through the beacon frame. Herein, the beacon frame may be a frame that is used for the WLAN. Additionally, information on the beacon frame may be transmitted through a Beacon interval field that is included in a frame body of the beacon frame.

Technical characteristic 2.B.i.1: Information on the number of available subchannels and information on subchannel indexes may be transmitted through the beacon frame. For example, the information on the number of available subchannels and information on subchannel indexes may be transmitted through an Option field that is included in the beacon frame.

Technical characteristic 2.B.ii: As another example, when a receiving STA associates with a transmitting STA, the receiving STA may receive information on the subchannel, e.g., information on the size of a subchannel, information on a number of subchannels, information on a subchannel index, through an association frame. Alternatively, the receiving STA may receive the information from an initiator/AP when performing negotiation or initiation for the sensing operation.

Figure 19:
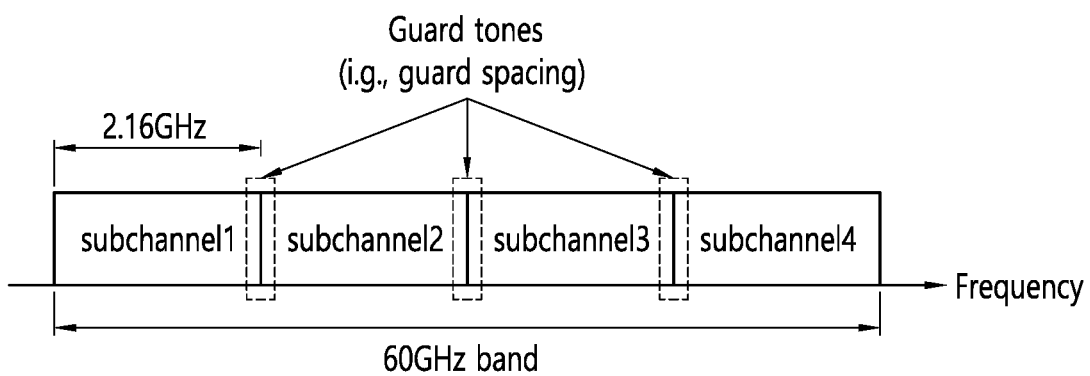
FIG. 19 shows an example of a subchannel being configured at a 60 GHz band.

Technical characteristic 2.C: When multiple subchannels are used for sensing, a guard tone may be configured between the subchannels. For example, when sensing is performed by using 4 subchannels of 2.16 GHz subchannel units, a subchannel may be configured as shown in FIG. 19. FIG. 19 shows an example of a subchannel being configured at a 60 GHz band.

Referring to FIG. 19, 2.16 GHz Subchannel 1 to 2.16 GHz Subchannel 4 may be contiguously configured. Each of the 2.16 GHz Subchannel 1 to 2.16 GHz Subchannel 4 may be allocated to a different receiving STA. At this point, a guard tone may be configured between the subchannels. The guard tone may be a tone that is configured in order to prevent interference caused by signal transmission/reception between adjacent subchannels.

Technical characteristic 2.C.i: In order to prevent interference, a guard tone may be configured between the subchannels. For example, a sensing PPDU may be configured by using a tone plan for 2.16 GHz. For example, the tone plan for 2.16 GHz may mean a configuration that separates subchannels so that four (4) 2.16 GHz subchannels can have a symbol rate of 1.728 Gigasymbols/second.

Technical characteristic 2.C.ii: A transmitting STA may simultaneously transmit/receive sensing frames to/from multiple receiving STAs by using the channelization process shown in FIG. 19. In the present specification, a sensing frame may be a frame for the WLAN sensing procedure of FIG. 3.

Technical characteristic 2. C.iii: A bandwidth field that is included in a 2.16 GHz PPDU, as described above, may be configured to have the size of the corresponding subchannel.

Technical characteristic 2.C.iv: The size of a subchannel performing sensing may be configured differently for each receiving STA. At this point, in case of a subchannel that is wider than 2.16 GHz, a PPDU may be configured by using channel aggregation. For example, a preamble part may be configured while considering the guard tone. Additionally, the Data field may be configured by using a tone plan that does not apply the guard tone, e.g., a 4.42 GHz tone plan.

Technical characteristic 2.C.v: depending upon the type of signal or frame for sensing, a signal or frame that does not include a Data field may exist. For example, a measurement frame may be configured of an NDP frame. Herein, the measurement frame may be a frame that is used during the WLAN sensing procedure of FIG. 3.

Technical characteristic 3: A maximum number of receiving STAs engaging (or participating) in the sensing operation may correspond to an example of a case where a single-user (SU) transmission is considered in each channel. That is, when a multi-user (MU) transmission is considered in one sensing channel, the maximum number of receiving STAs that engage in the sensing may be changed. For example, each of the subchannels of FIG. 19 may correspond to the multiple receiving STAs.

Technical characteristic 3.A: When an MU-multiple input multiple output (MIMO) based sensing is performed, the maximum number of receiving STAs that can be supported may be determined in advance (or prepended). For example, the maximum number of receiving STAs that can be supported may be equal to 8. At this point, a maximum number of spatial streams that can be supported may be configured to be equal to 2/4.

Figure 20:
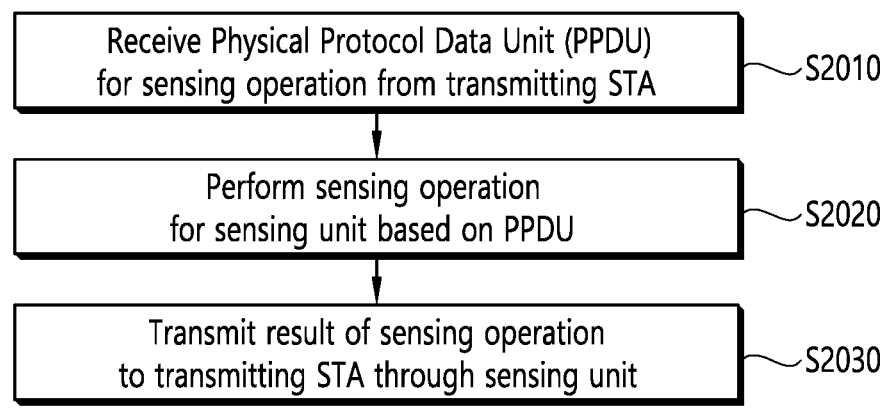
FIG. 20 shows a flowchart for an exemplary method for performing sensing by a receiving STA according to a partial implementation of the present specification.

FIG. 20 shows a flowchart for an exemplary method for performing sensing by a receiving STA according to a partial implementation of the present specification. The example of FIG. 20 may be a flowchart of an operation performed by a receiving STA for part or all of the WLAN sensing procedure of FIG. 3. In FIG. 20, a transmitting STA may be a sensing initiator of Table 1, and a receiving STA may be a sensing responder of Table 1.

Referring to FIG. 20, a receiving station (STA) receives a physical protocol data unit (PPDU) for a sensing operation from a transmitting STA (S2010). For example, step S2010 may be performed during a Discovery process or Negotiation process of the WLAN sensing procedure of FIG. 3. For example, the PPDU may be transmitted through the above-described sensing initiation request frame. Herein, the PPDU may include at least one control field. Alternatively, step S2010 may be performed during an Association process between the transmitting STA and the receiving STA. Alternatively, the PPDU may be transmitted by using a beacon frame. Additionally, the at least one control field may include allocation information related to a sensing unit. For example, the at least one control field may be RU allocation information or RU allocation subfield being included in a common field within an EHT-SIG of FIG. 13. The allocation information related to the sensing unit may be included in the RU allocation subfield.

Based on the PPDU, the receiving STA performs a sensing operation for the sensing unit (S2020). For example, step S2020 may be performed during the Negotiation process or Measurement Exchange process of the WLAN sensing procedure of FIG. 3.

The receiving STA transmits a result of the sensing operation to the transmitting STA through the sensing unit (S2030). For example, step S2030 may be performed during the Measurement Exchange process of the WLAN sensing procedure of FIG. 3. A result of the sensing operation may be transmitted through the above-described measurement frame or feedback frame.

Figure 21:
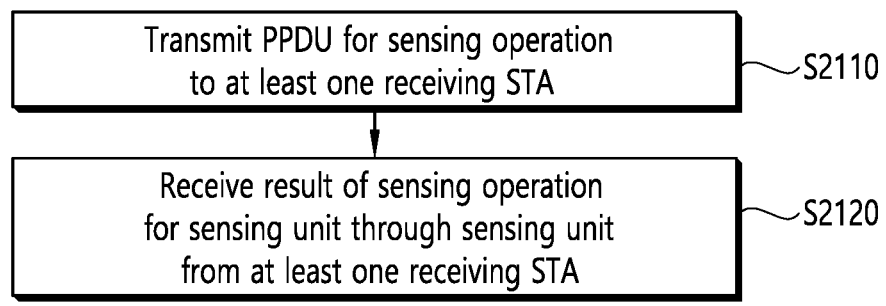
FIG. 21 shows a flowchart for an exemplary method for performing sensing by a transmitting STA according to a partial implementation of the present specification.

FIG. 21 shows a flowchart for an exemplary method for performing sensing by a transmitting STA according to a partial implementation of the present specification. The example of FIG. 21 may be a flowchart of an operation performed by a transmitting STA for part or all of the WLAN sensing procedure of FIG. 3. In FIG. 21, a transmitting STA may be a sensing initiator of Table 1, and a receiving STA may be a sensing responder of Table 1.

Referring to FIG. 21, a transmitting STA transmits a PPDU for a sensing operation to at least one receiving STA (S2110). Herein, the PPDU may include at least one control field. Additionally, the at least one control field may include allocation information related to a sensing unit. For example, step S2110 may be performed during a Discovery process or Negotiation process of the WLAN sensing procedure of FIG. 3. For example, the PPDU may be transmitted through the above-described sensing initiation request frame. Alternatively, step S2110 may be performed during an Association process between the transmitting STA and the at least one receiving STA. Alternatively, the PPDU may be transmitted by using a beacon frame.

The transmitting STA receives a result of the sensing operation for the sensing unit from the at least one receiving STA through the sensing unit (S2120). For example, step S2120 may be performed during the Negotiation process or Measurement Exchange process of the WLAN sensing procedure of FIG. 3. A result of the sensing operation may be transmitted through the above-described measurement frame or feedback frame.

Herein, the sensing units that are allocated for each of the at least one receiving STA may be different from one another. More specifically, the position and/or size of the sensing unit being allocated for each of the at least one receiving STA may be different from one another. For example, when the sensing unit is a subchannel, a sensing unit that is allocated to a first receiving STA included in the at least one receiving STA may be a 40 MHz subchannel, and a sensing unit that is allocated to a second receiving STA included in the at least one receiving STA may be a 20 MHz subchannel. Alternatively, when the sensing unit is a subchannel, a sensing unit that is allocated to each of the first receiving STA and the second receiving STA may be a 20 MHz subchannel located at different positions.

Additionally, the device that is proposed in the present specification is not mandatorily required to be equipped with a transceiver and may be implemented in a chip form including a processor and a memory. Such device may generate/store a transmission PPDU according to the above-described example. Such device may be operatively connected to a separately manufactured transceiver, so as to actually support transmission/reception.

The present specification proposes a computer readable medium that is implemented in various forms. The computer readable medium according to the present specification may be encoded to at least one computer program including instructions. The instructions that are stored in the medium may control the processor that is described in FIG. 14, and so on. That is, the instructions that are stored in the medium controls the processor that is proposed in the present specification and performs process steps of the operations of the above-described transmitting/receiving STAs (e.g., FIG. 20 or FIG. 21).

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyperparameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

What is claimed is:

1. A method performed in a Wireless Local Area Network (WLAN) system, the method comprising:
receiving, by a first station (STA), a physical protocol data unit (PPDU) for a sensing operation from an access point (AP),
wherein the PPDU has a total bandwidth of 80 MHz and includes a first subchannel allocated for a sensing operation of the first STA and a second subchannel allocated for a sensing operation of a second STA, wherein a bandwidth of the first subchannel is a multiple of 20 MHz,
wherein the PPDU includes a legacy signal (L-SIG) field includes a length field related to a length of the PPDU, wherein the length field is set to a value satisfying a condition that a remainder is zero when the length field is divided by three, wherein the L-SIG field has a bandwidth of 20 MHz and is duplicated in each subchannel of the 80 MHz,
wherein the PPDU further includes a repeated L-SIG (RL-SIG) field which is a repeat of the L-SIG field, wherein the RL-SIG field is contiguous to the L-SIG field in the PPDU,
wherein the PPDU further includes a first universal signal (U-SIG) field for the first subchannel, wherein the first U-SIG field includes first bandwidth bits indicating a bandwidth of the first subchannel, wherein the first U-SIG field has a bandwidth of 20 MHz and is duplicated in the first subchannel,
wherein the PPDU further includes a second U-SIG field for the second subchannel, wherein the second U-SIG field includes second bandwidth bits indicating a bandwidth of the second subchannel, wherein the second U-SIG field has a bandwidth of 20 MHz,
wherein the PPDU further includes a first extremely high throughput signal (EHT-SIG) field indicating at least one first resource unit (RU) allocated for the first STA, wherein the first EHT-SIG field is contiguous to the first U-SIG field in the PPDU, and
wherein the PPDU further includes a second EHT-SIG field indicating at least one second RU allocated for the second STA, wherein the second EHT-SIG field is contiguous to the second U-SIG field in the PPDU,
performing, by the first STA, the sensing operation based on the at least one first RU; and transmitting, by the first STA, a result of the sensing operation.

2. The method of claim 1, wherein the first EHT-SIG field includes an STA-identifier (ID) for the first STA.

3. The method of claim 1, wherein the PPDU is configured based on a null data packet (NDP) frame format.

4. The method of claim 1, further comprising:
receiving, by the first STA, an Association Response frame from the AP, wherein the Association Response frame includes first control information related to the total bandwidth and second control information related to a size of the first subchannel.

5. The method of claim 1, wherein the PPDU includes four duplicated L-SIG fields and four duplicated RL-SIG fields in the 80 MHz.

6. The method of claim 1,
wherein a bandwidth of the first subchannel is 40 MHz, and a bandwidth of the second subchannel is 20 MHz,
wherein the PPDU includes two duplicated first U-SIG fields and one second U-SIG field.

7. A first station (STA) of a Wireless Local Area Network (WLAN) system, comprising:
a memory; and
a processor being operatively connected to the memory, wherein the processor is adapted to:
receive a physical protocol data unit (PPDU) for a sensing operation from an access point (AP),
wherein the PPDU has a total bandwidth of 80 MHz and includes a first subchannel allocated for a sensing operation of the first STA and a second subchannel allocated for a sensing operation of a second STA, wherein a bandwidth of the first subchannel is a multiple of 20 MHz,
wherein the PPDU includes a legacy signal (L-SIG) field includes a length field related to a length of the PPDU, wherein the length field is set to a value satisfying a condition that a remainder is zero when the length field is divided by three, wherein the L-SIG field has a bandwidth of 20 MHz and is duplicated in each subchannel of the 80 MHz,
wherein the PPDU further includes a repeated L-SIG (RL-SIG) field which is a repeat of the L-SIG field, wherein the RL-SIG field is contiguous to the L-SIG field in the PPDU, wherein the PPDU further includes a first universal signal (U-SIG) field for the first subchannel, wherein the first U-SIG field includes first bandwidth bits indicating a bandwidth of the first subchannel, wherein the first U-SIG field has a bandwidth of 20 MHz and is duplicated in the first subchannel,
wherein the PPDU further includes a second U-SIG field for the second subchannel, wherein the second U-SIG field includes second bandwidth bits indicating a bandwidth of the second subchannel, wherein the second U-SIG field has a bandwidth of MHz,
wherein the PPDU further includes a first extremely high throughput signal (EHT-SIG) field indicating at least one first resource unit (RU) allocated for the first STA, wherein the first EHT-SIG field is contiguous to the first U-SIG field in the PPDU,
wherein the PPDU further includes a second EHT-SIG field indicating at least one second RU allocated for the second STA, wherein the second EHT-SIG field is contiguous to the second U-SIG field in the PPDU,
perform the sensing operation based on the at least one first RU; and
transmit a result of the sensing operation.

8. The first STA of claim 7, wherein the first EHT-SIG field includes an STA-identifier (ID) for the first STA.

9. The first STA of claim 7, wherein the PPDU is configured based on a null data packet (NDP) frame format.

10. The first STA of claim 7, wherein the processor is further adapted to:
receive an Association Response frame from the AP, wherein the Association Response frame includes first control information related to the total bandwidth and second control information related to a size of the first subchannel.

11. The first STA of claim 7, wherein the PPDU includes four duplicated L-SIG fields and four duplicated RL-SIG fields in the 80 MHz.

12. The first STA of claim 7,
wherein a bandwidth of the first subchannel is 40 MHz, and a bandwidth of the second subchannel is 20 MHz,
wherein the PPDU includes two duplicated first U-SIG fields and one second U-SIG field.

* * * * *